(12) United States Patent
Casaletto et al.

(10) Patent No.: US 9,348,865 B2
(45) Date of Patent: May 24, 2016

(54) SYSTEM AND METHOD FOR MASSIVELY PARALLEL PROCESSING DATABASE

(71) Applicant: Futurewei Technologies, Inc., Plano, TX (US)

(72) Inventors: Holly Zeng Casaletto, Sunnyvale, CA (US); Qingqing Zhou, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 247 days.

(21) Appl. No.: 14/243,461

(22) Filed: Apr. 2, 2014

(65) Prior Publication Data

US 2015/0286678 A1    Oct. 8, 2015

(51) Int. Cl.
*G06F 17/30* (2006.01)

(52) U.S. Cl.
CPC .... *G06F 17/30445* (2013.01); *G06F 17/30477* (2013.01)

(58) Field of Classification Search
CPC ................................................ G06F 17/30445
See application file for complete search history.

(56) References Cited

U.S. PATENT DOCUMENTS

| | | | | |
|---|---|---|---|---|
| 5,870,743 | A * | 2/1999 | Cohen | G06F 17/30455 |
| 6,691,109 | B2 * | 2/2004 | Bjornson | G06F 17/30445 |
| 2008/0126357 | A1 * | 5/2008 | Casanova | G06F 17/30215 |
| 2010/0074269 | A1 | 3/2010 | Lin | |
| 2014/0188841 | A1 * | 7/2014 | Sun | G06F 17/30483 707/718 |

FOREIGN PATENT DOCUMENTS

| | | |
|---|---|---|
| CN | 101908075 A | 12/2010 |
| CN | 102567495 A | 7/2012 |
| CN | 103488778 A | 1/2014 |

OTHER PUBLICATIONS

International Search Report of Patent Cooperation Treaty (PCT), International Application No. PCT/CN2015/075787, Applicant Huawei Technologies Co., Ltd., date of mailing Jun. 26, 2015, 14 pages.

* cited by examiner

*Primary Examiner* — William Spieler
(74) *Attorney, Agent, or Firm* — Slater Matsil, LLP

(57) ABSTRACT

In one embodiment, a method for managing database resources includes selecting a first query from a queue of queries and transmitting, by a global resource manager to a portion of a plurality of data nodes, a plurality of reserve resource messages. The method also includes receiving, by the global resource manager from the portion of the plurality of data nodes, a plurality of acknowledgement messages and transmitting, by the global resource manager to a coordinator node, an execute query message when the plurality of acknowledgement messages are positive acknowledgements.

20 Claims, 6 Drawing Sheets

SYSTEM AND METHOD FOR MASSIVELY PARALLEL PROCESSING DATABASE

TECHNICAL FIELD

The present invention relates to a system and method for databases, and, in particular, to a system and method for massively parallel processing databases.

BACKGROUND

Massively parallel processing (MPP) database management systems were developed in the late 1980s and early 1990s to enhance query performance and platform scalability. MPP databases include coordinated processing of a program, such as a database management system, by multiple processors which operate on different partitions of the database. Other database systems include a symmetrically parallel system (SMP) for applications such as online analytic processing (OLAP) and data warehouse (DW).

An MPP database system is based on shared-nothing architecture, with each member node having its own central processing unit (CPU), memory, and storage subsystems. Each data node only manages its own portion of data and its own resources, with no data sharing among the nodes. However, these data nodes may communicate with one another to exchange data during execution. When a database query is dispatched by a coordinator node, the execution job of the query is divided up and assigned to some or all of the data processing nodes according to the data distribution. Execution of database queries involves resources, including memory, CPU, disk input/output units, and other resources which are locally managed by each individual data node. Depending on the data distribution, the divided job parts require different amounts of resources on different nodes. When many concurrent queries are executed in parallel, the difference of their need for resources may result in a skewed distribution of the free resources on data nodes, causing the next scheduled query to be in danger of running part of its execution on nodes that are low on resources. One challenge in MPP database systems is to align resources with workload across all the data nodes to prevent the entire system from slowing down on performance and throughput because of single point resource insufficiencies (SPRI).

SUMMARY

An embodiment method for managing database resources includes selecting a first query from a queue of queries and transmitting, by a global resource manager to a portion of a plurality of data nodes, a plurality of reserve resource messages. The method also includes receiving, by the global resource manager from the portion of the plurality of data nodes, a plurality of acknowledgement messages and transmitting, by the global resource manager to a coordinator node, an execute query message when the plurality of acknowledgement messages are positive acknowledgements.

Another embodiment method for managing database resources includes transmitting, by a data node to a global resource manager, a plurality of query candidates, where the data node has sufficient resources to execute the plurality of query candidates and receiving, by the data node from the global resource manager, a reserve resources message. The method also includes reserving a portion of resources of the data node, where the reserve resources message indicates the portion of resources and transmitting, by the data node to the global resource manager, an acknowledgement message, where the acknowledgement message is a positive acknowledgement when reserving the portion of resources is successful and a negative acknowledgement when reserving the portion of resources is not successful. Additionally, the method includes receiving, by the data node from a coordinator node, an execute query message.

An embodiment computer includes a processor and a computer readable storage medium storing programming for execution by the processor. The programming includes instructions to select a first query from a queue of queries and transmit, to a portion of a plurality of data nodes, a plurality of reserve resource messages. The programming also includes instructions to receive, from the portion of the plurality of data nodes, a plurality of acknowledgement messages and transmit, to a coordinator node, an execute query message when the plurality of acknowledgement messages are positive acknowledgements.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
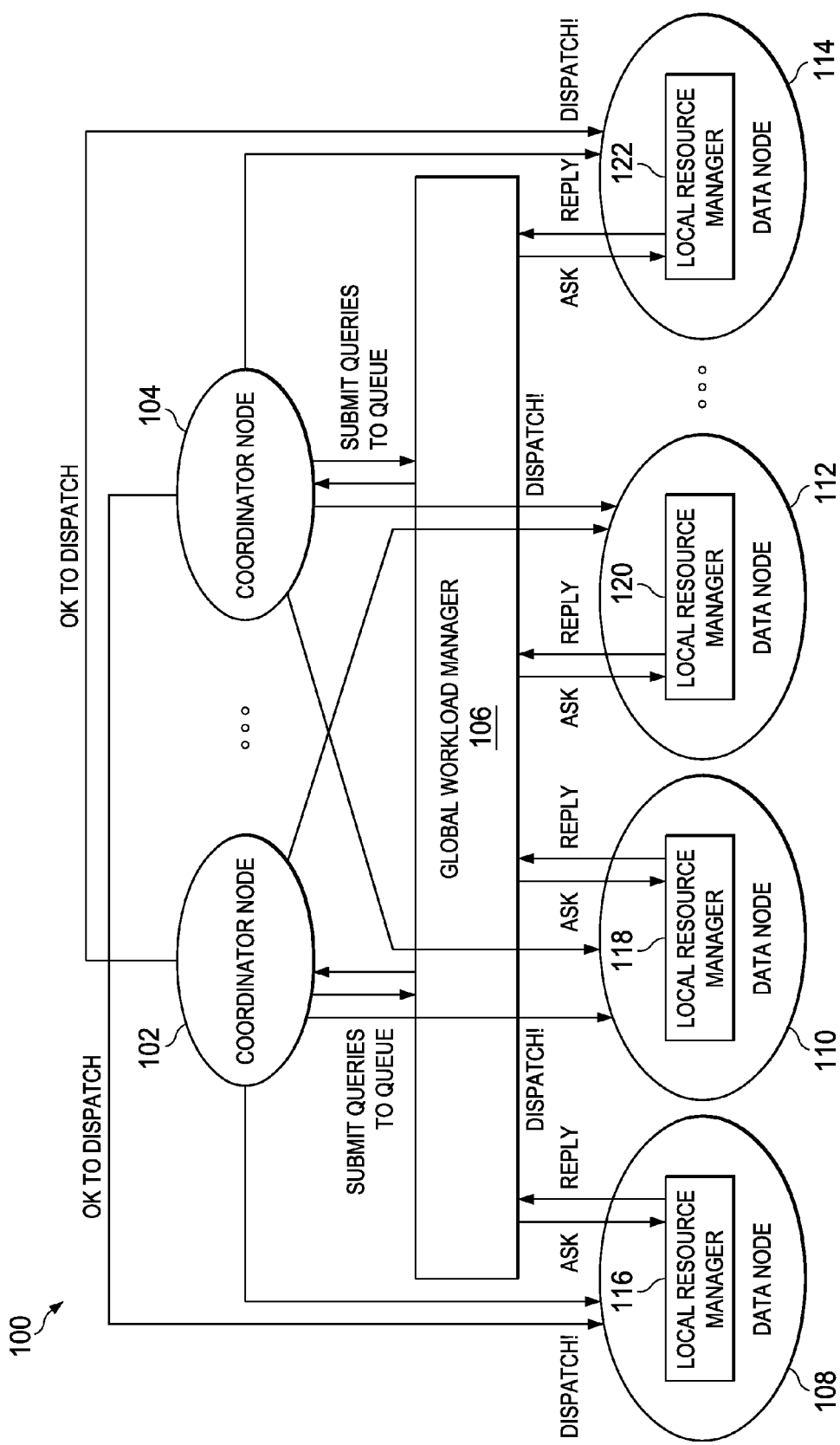
FIG. 1 illustrates an embodiment massively parallel processing (MPP) database system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment relates to a mechanism in which resources are managed to maximize workload execution in a massively parallel processor (MPP) database system. In an MPP database system, data is partitioned across multiple nodes, and workload is scheduled to execute in parallel on some or all of the data nodes. However, data partitions may not distribute evenly across nodes, and the amount of free resources on the nodes may vary significantly. In one example, the MPP database system does not take any individual nodes' resource availability into consideration when a query is dispatched. This may lead to the resource insufficiency of one node slowing down other nodes or causing runaway queries.

An embodiment comprises a three phase communication protocol between two resource management layers, so the two layers communicate with commitment about resources before a query is dispatched to execution, with sufficient resources generally guaranteed. In an example, an MPP database cluster is configured to have one or several coordinator nodes and multiple data processing nodes. Coordinator nodes coordinate with the database clients and dispatch queries to data processing nodes for execution. Coordinator and data nodes together make up an MPP database cluster. An MPP cluster may have 200 or more nodes.

In a single, non-distributed database management system, because the workload and the resources are both physically local to the system, the balance of workload and resources may be managed by its component resource manager without any communication outside the node. However, in a distributed database management system, the resources necessary for supporting the data processing are distributed. An embodiment provides a two-layer resource management mechanism in which the global resource manager manages the workload globally, while the local resource managers manage, in a distributed manner, the resources on the data nodes, with a three-phase communication protocol to facilitate the exchange of information.

An embodiment assigns workload to data processing nodes with resources reserved on that node. Two layers (2L) of resource management exist on an MPP database system—a global resource manager as a centralized workload dispatcher for coordinator nodes, and data nodes with individual resource managers managing the resources locally. The global resource manager coordinates among the local resource managers to admit queries into execution. A three phase dispatching (3PD) protocol with a sub-cycle optimization is used. The global resource manager transmits the initial message to the local resource managers inquiring about the sufficiency of resources to accommodate a group of queries. The local resource managers reply with the set of queries that they can accommodate. The global resource manager performs an intersection on all the returned sets from the local resource managers and selects the query to be dispatched. The global resource manager then sends out the second message to the local resource managers asking them to reserve the resources. The local resource managers reply with a positive acknowledgement if the reservation is successful or a negative acknowledgement if it is not successful. The global resource manager signals the coordinator to dispatch the query if and only if all the local resource managers send back the positive acknowledgement. Any one negative response means that the query cannot be dispatched yet. The sub-cycle optimization comes in when the intersection produces a set that has more than one query, in which case Phase 2 to Phase 3 is repeated as the sub-cycle until no more candidate queries can be dispatched. This two-layer three-phase dispatching (2L3PD) protocol facilitates dispatching the load of data processing to the data nodes with the amount of resources required to execute the load.

FIG. 1 illustrates architecture 100 of an embodiment MPP database system. The coordinator receives the query from a client. Then, the coordinator node, such as coordinator node 102 or coordinator node 104, initiates a query. Although two coordinator nodes are pictured, fewer or more coordinator nodes may be present. The coordinator nodes (CNs) coordinate queries on multiple data nodes.

The global layer, the global resource manager 106, also referred to as the global workload manager, is logically a centralized component that maintains different priority level queues that accept user queries submitted by coordinators and coordinates with the local layer for resources to dispatch. Having a global layer of the resource management centralized instead of distributed in each coordinator node prevents the system from having multiple queues of the same priority level competing for resources, which may cause starvation of some coordinator nodes in the system.

Global resource manager (GRM) 106 is coupled to coordinator nodes 102 and 104. The coordinator node transmits a query to the global resource manager for scheduling. When the query is approved by global resource manager 106 for dispatching, the coordinator node where the query originates is notified, and execution is initiated by the coordinator node to the involved data nodes.

The local layer is distributed to reside on each data processing node, which keeps track of the free resources on that node. FIG. 1 pictures four data nodes (DNs), data node 108, data node 110, data node 112, and data node 114, but fewer or more data nodes may be used. Data nodes 108, 110, 112, and 114 each have a local resource manager (LRM), local resource managers 116, 118, 120, and 122, respectively. The data nodes perform the query on their own resources. The results are returned to the coordinator node.

Figure 2:
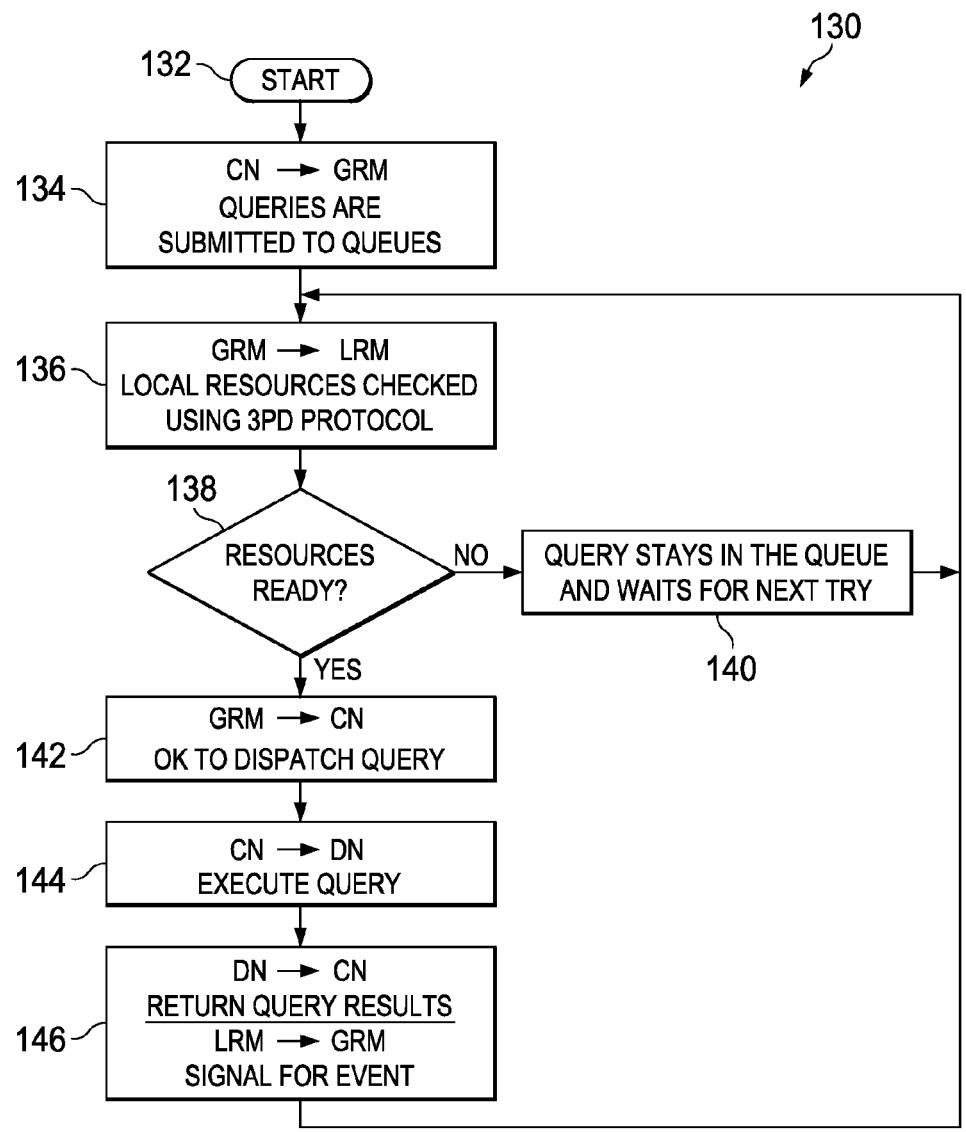
FIG. 2 illustrates a flowchart for an embodiment method of managing resources in an MPP database.

FIG. 2 illustrates flowchart 130 for a method of managing resource in two layer resource management for an MPP system. Initially, in step 132, the method begins with the coordinator node receiving a query from a client. There is already a connection between the coordinator nodes, the global resource manager, and the data nodes.

In step 134, the coordinator node submits parsed queries with their optimized plans to the queues on the global resource manager.

Then, in step 136, the global resource manager communicates with the local resource managers through three-phase dispatching protocol (3PD) to determine whether sufficient resources may be secured for executing queries. The global resource manager asks the data nodes which queries they have the resources to perform, and the data nodes respond. The global resource manager selects a query which may be performed, and requests that the data nodes reserve the resources for this query. The data nodes respond with acknowledgement messages indicating the success of the resource reservation.

Next, in step 138, the global resource manager determines which query will be admitted into execution. Only one query is approved at a time. When the query is not approved, in step 140, the query stays in the queue and waits to try again. Then, step 136 is repeated to determine the resource availability. When the query is approved, in step 142, the global resource manager notifies the coordinator node to dispatch the query.

In step 144, the coordinator node notifies the data nodes to execute the query, and the data nodes execute the query.

Finally, in step 146, the data nodes return the results of the query to the coordinator nodes. Also, the data nodes signal the global resource manager to indicate that their resources are now available. The system then returns to step 136 to ascertain resources for other queries.

There is a three-phase dispatching protocol for communication between the global and the local resource managers. A three-phase protocol is beneficial because the global resource manager always works with a group of queries for resource inquiries. The local resource managers can only respond in phase 1 with the intent to accommodate the execution, but cannot reserve the resources just yet, before the global resource manager finds out which of the groups can execute with all the data nodes' support in phase 2. There are benefits to inquiring about group of queries instead of just one query. Inquiring about one query at a time may be inefficient at dispatching approval for a query that can execute following a sequence of queries that cannot execute. This query will have to wait until all the other queries in the sequence are performed. This prolongs the time for dispatching a query, while the network traffic for evaluating the other queries prior to the successful dispatching increases the communication costs. Also, inquiring resources for a group of queries facilitates the 3-phase protocol to have a sub-cycle optimization, where some of the queries in the return set in phase 1 inquire later and get scheduled directly from phase 2.

Figure 3:
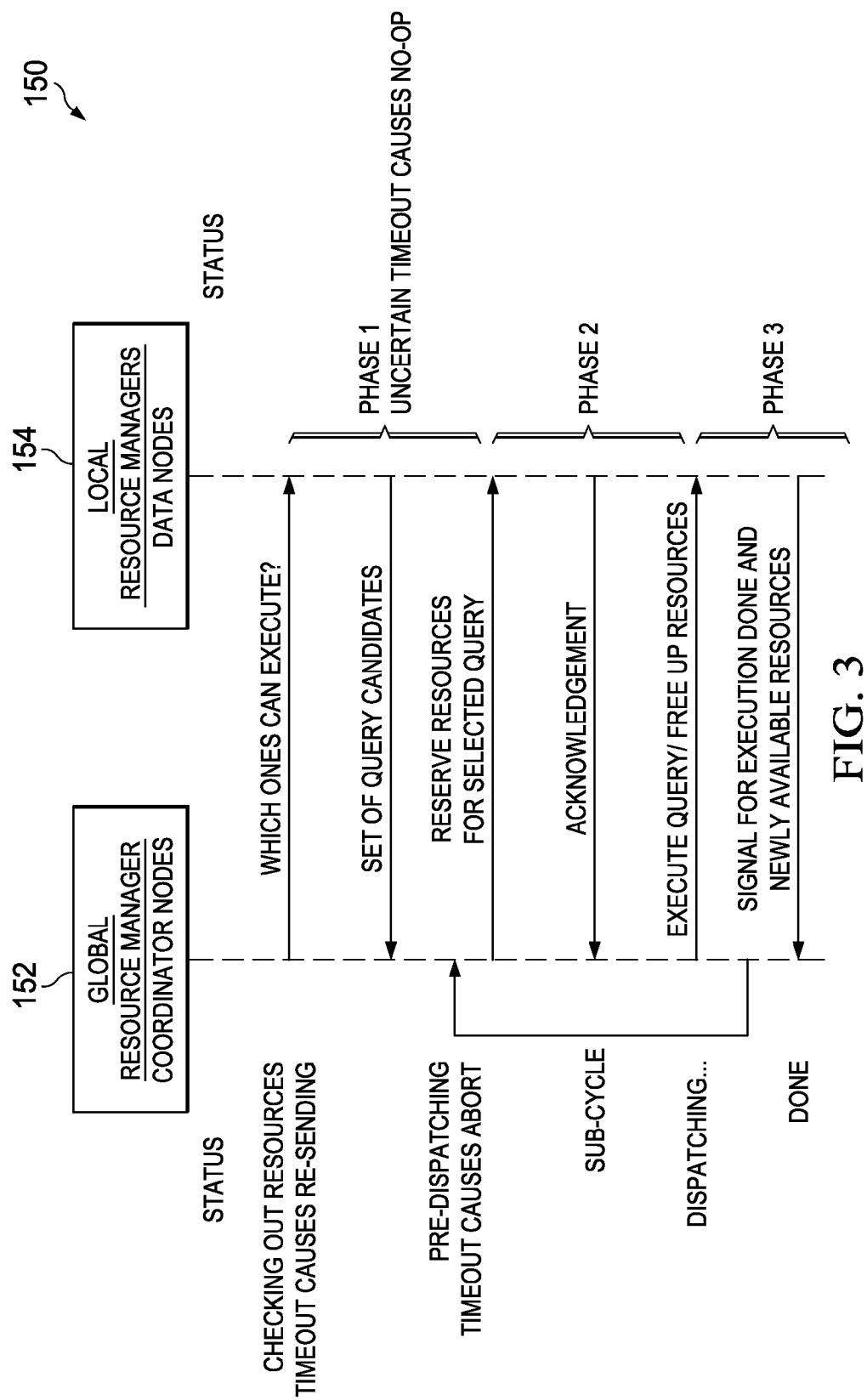
FIG. 3 illustrates an embodiment message diagram for managing resources in an MPP database.

FIG. 3 illustrates message diagram 150 depicting communications between global resource manager and coordinator nodes 152 and local resource managers and data nodes 154. In phase 1, the global resource manager investigates the availability of the resources on the data nodes. A which ones can execute (WOCE) message is sent by the global resource manager to the data nodes. The WOCE message contains an array of queries (QArr1) with their corresponding resource requirements (memory, threads, input/output (I/O) cost, etc.). The size of the array falls in the range between 1 and maximum_number_of active_sessions. Initially, the global resource manager periodically sends out the WOCE messages during the time interval. In response to the WOCE messages, the data nodes send a set of query candidates that they have the resources to support. This proceeds until the point where the intersection of the replies to the WOCE message produces an empty query set. That is, the data nodes do not have the resources to perform any more queries. The global resource manager takes a break from sending out WOCE messages, and waits for signals from the data nodes with freed resources from executed queries. It resumes sending out periodic WOCE messages when it gets a signal, and takes a break again when one WOCE message receives an empty set of queries to schedule. The global resource manager stays in this cycle while the resource management is enabled. In phase 1, the local resource managers are not held back to wait for a message from the global resource manager after they send their replies. Thus, when the intersection of their replies produces an empty query set, the global resource manager does not send back additional messages to notify the local resource managers. Timeout is harmless and causes no-op.

In phase 2, pre-dispatching is performed. The global resource manager performs an intersection of all the replies and finds a set of queries (QArr2). QArr2 is the set of queries where there are sufficient resources on the data nodes to execute that query. The global resource manager selects the query with the highest priority from QArr2. A reserve resources (RS) message is sent from the global resource manager to the local resource managers for the selected query. The selected query is then removed from QArr2. The local resource managers receive the RS messages and attempt to reserve the resources promised in phase 1. The local resource managers send back an acknowledgment message, indicating whether their resources were successfully reserved. In phase 2, a timeout leads to aborting the resource reservation.

Dispatching is performed in phase 3 when the global resource manager receives positive acknowledgements from all the local resources managers involved in the query indicating that the resources have been successfully reserved. The global resource manager notifies the coordinator node, and, through the coordinator node, dispatches the query to the data nodes for execution. Any negative acknowledgments cause the query to be aborted. Upon receiving a negative acknowledgement, the global resource manager notifies the local resource managers to free up the reserved resources. When the dispatching is successful, after the global resource manager sends out the message to the coordinator node for the query to execute, the global resource manager goes back to phase 2 if QArr2 is not empty, and sends out an RS message for the next selected query. This sub-cycle of phase 2 to phase 3 is repeated until either QArr2 is empty or an RS message fails to receive a positive acknowledgement from all the local resource managers. When a query is dispatched, data nodes execute the query, and return the query result to the coordinator node when the execution is done. After the query is completed, the local resource managers signal the global resource manager on the newly available resources.

Figure 4:
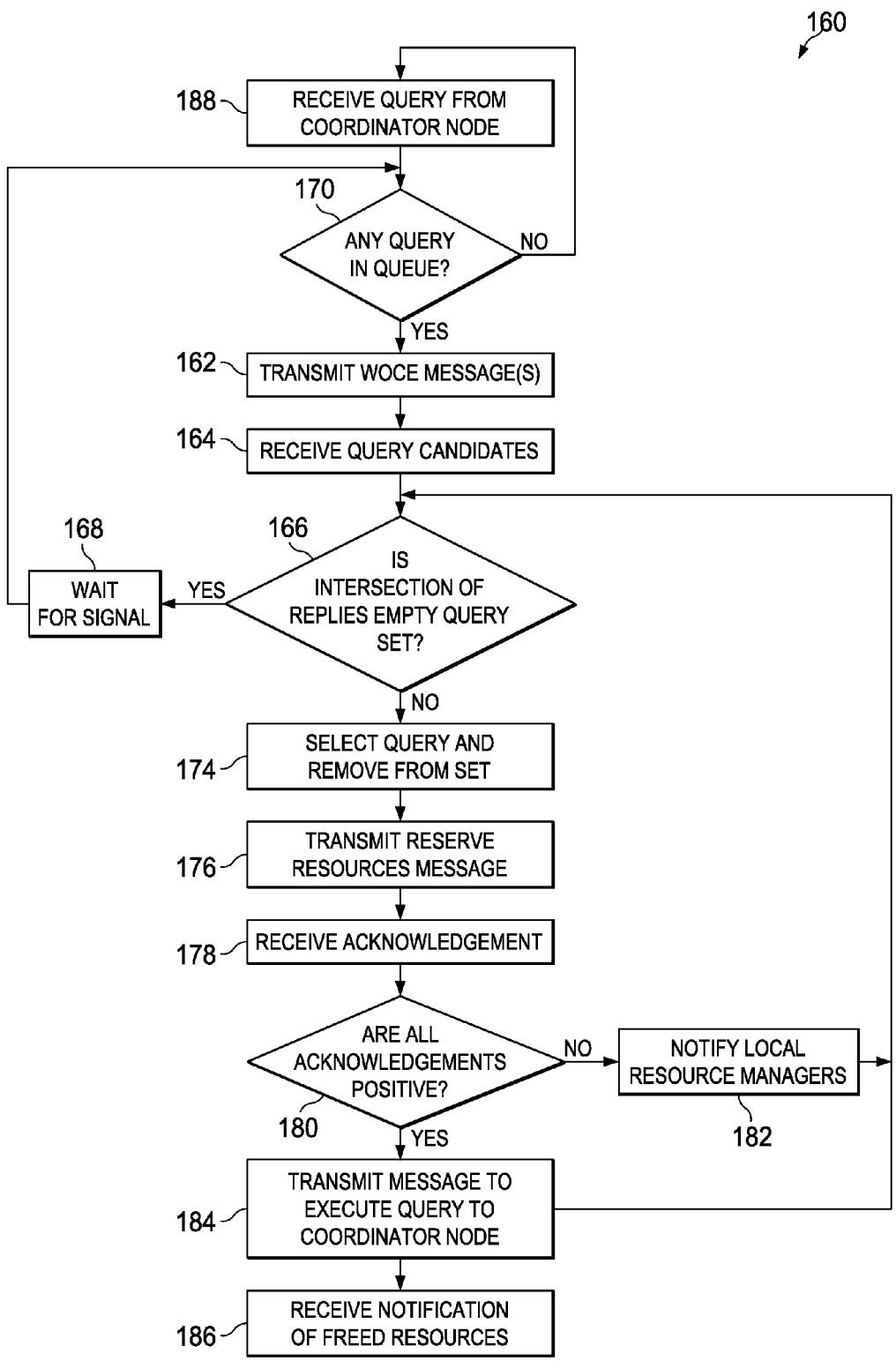
FIG. 4 illustrates a flowchart for an embodiment method of managing resources performed in a global resource manager.

FIG. 4 illustrates flowchart 160 for a method of resource scheduling performed by a global resource manager. Initially, in step 188, the global resource manager waits to receive a query from the coordinator node. When the global resource manager receives a query, it adds the received query request to QArr1, a queue of queries to be executed. In one example, the queries in QArr1 are arranged by priority. The size of QArr1 is between 1 and the maximum number of active sessions. In another example, the queries are sorted by their submission timestamps.

In step 170, the global resource manager determines whether there are any queries in the queue. When there are no queries in the queue, the global resource manager returns to step 188 to wait to receive a query from a coordinator node. When there is at least one query in the queue, the global resource manager proceeds to step 162.

In step 162, the global resource manager transmits WOCE messages to the data nodes. The WOCE message contains the queue of queries with their resource requirements, for example, memory, threads, and I/O cost. The resource availability for all the queries in the queue is requested.

In response, in step 164, the global resource manager receives messages from the data nodes with query candidates that the data nodes can execute. The response indicates the portions of the queries that each data node can handle with their available resources.

Next, in step 166, the global resource manage takes the intersection of the replies received in step 164 to determine which queries may be executed on the data nodes with the available resources. In one example, only one query is scheduled at a time. In another example, when the intersection has more than one query, multiple queries are scheduled at once. When the intersection is an empty query set, the global resource manager waits for a signal in step 168. The signal may be a new query from the coordinator node or a notification of freed resources from a data node which has completed execution of a query. When a signal is received, the global resources manager proceeds to step 170. When the intersection is not the empty set, the global resource manager proceeds to step 174.

Then, in step 174, one query is selected to be executed and removed from the queue. This query may be the highest priority query that has sufficient resources available on the data nodes to be executed. The selected query is the query to be executed.

Next, in step 176, the global resource manager transmits a reserve resources message to request that data nodes that will participate in the selected query to reserve resources. The reserve resources message tells the data nodes to allocate the resources to perform the assigned portion of the query.

In response, in step 178, the global resource manager receives acknowledgements from the data nodes. The responses may be positive acknowledgements indicating that the resources have been reserved or negative acknowledgements indicating that the resources have not been successfully reserved.

Next, in step 180, the global resource manager determines whether all of the acknowledgement messages are positive acknowledgements. If there are any negative acknowledgements, the query cannot be performed as allocated, and the global resource manager proceeds to step 182. In step 182, the query is canceled, and put back in the queue of queries. The global resource manager notifies the data nodes to free up the resources reserved for the cancelled query.

When all of the acknowledgements are positive acknowledgements, the global resource manager proceeds to step 184. In step 184, the global resource manager transmits a message to the coordinator node notifying the coordinator node that the resources on the data nodes are reserved to execute the query. After transmitting this message, the global resource manager proceeds to step 166 to determine whether there are any queries in the queue which have sufficient resources for execution. Meanwhile, in step 186, the global resource manager receives notifications of freed resources from the data nodes that have performed the query.

Figure 5:
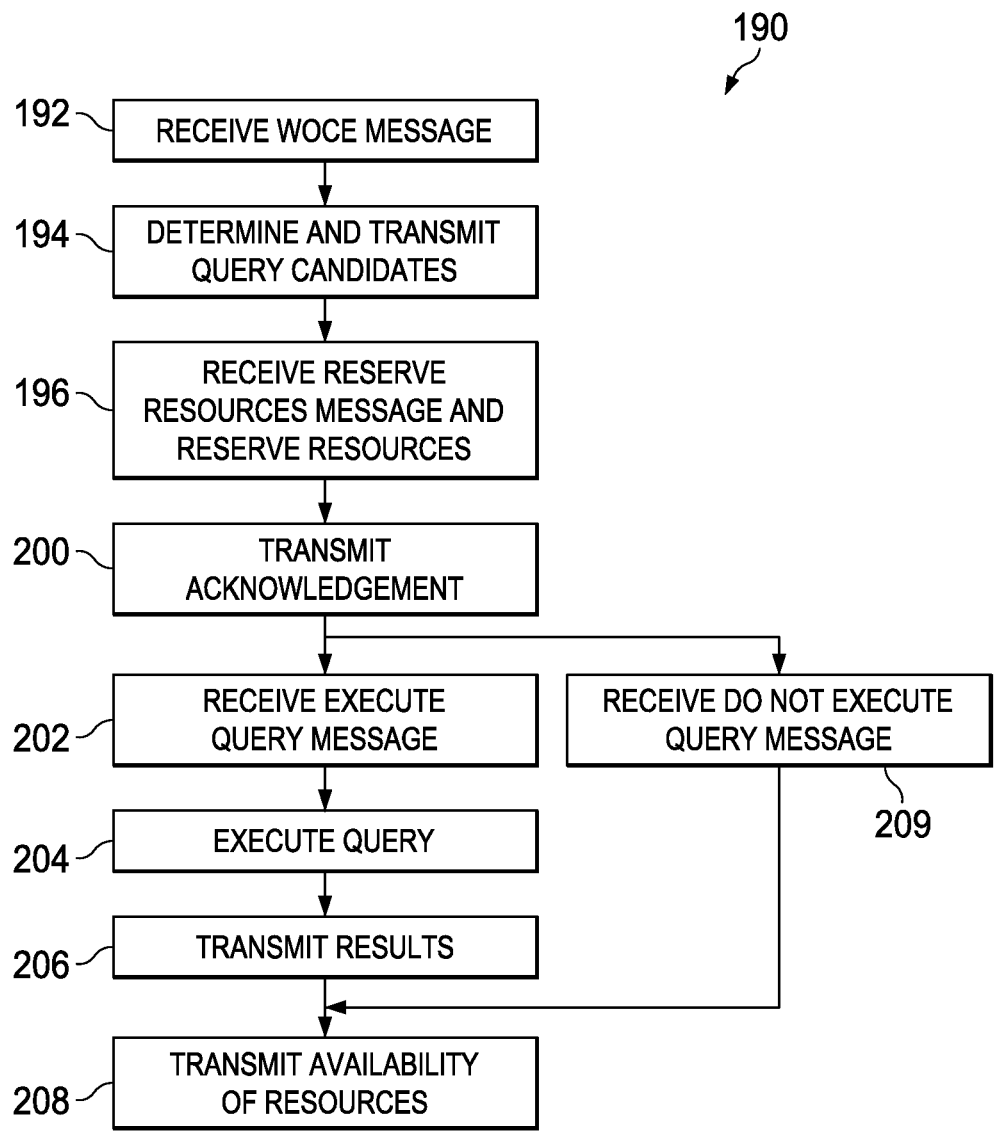
FIG. 5 illustrates a flowchart for an embodiment method of managing resources performed in a data node.

FIG. 5 illustrates flowchart 190 for a method of resource scheduling in a database performed by a data node. Initially, in step 192, the data node receives a WOCE message from the global resource manager. The WOCE message contains an array of queries and the corresponding resource requirements.

Then, in step 194, the data node determines which portions of the queries that data node has the resources to perform. The data node responds to the global resource manager with the queries that it has the resources to perform.

Next, in step 196, the data node receives a reserve resources message from the global resource manager. The reserve resources message requests that the data node reserve the resources for the query. The data node reserves the resources in the reserve resources message if they are available.

The data node responds to the global resource manager with an acknowledge message in step 200. A positive acknowledgement indicates that the data node has been successful in reserving resources, while a negative acknowledgment indicates that the data node has not been successful in reserving the resources.

The data node receives an execute query message from the coordinator node in step 202. The execute query message requests that the data nodes execute the query.

After receiving the execute query message, the data node executes the query in step 204. The execution may involve sharing data with other data nodes. The data node releases the reserved resources after the query is executed.

After executing the query, in step 206, the data node transmits the results of the query to the coordinator node.

Also, the data node transmits a message to the global resource manager indicating that its resources have been freed in step 208. Sometimes, instead of receiving an execute query message from the coordinator node, the data node receives a do not execute query message from the global resource manager in step 209. The data node proceeds to step 208 to free up the reserved resources.

Figure 6:
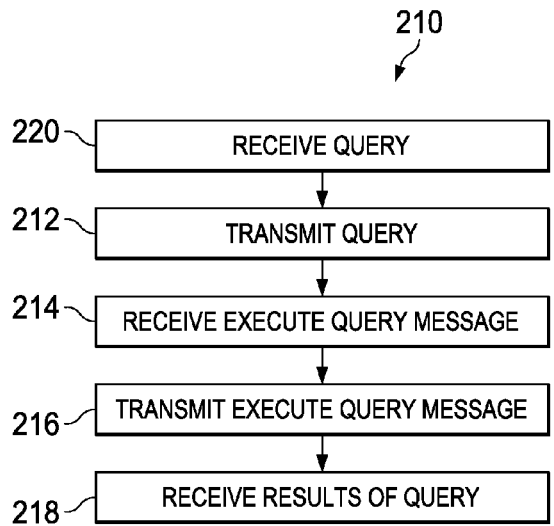
FIG. 6 illustrates a flowchart for an embodiment method of managing resources performed in a coordinator node.

FIG. 6 illustrates flowchart 210 for a method of reserving resources in a database performed by a coordinating node. Initially, in step 220, the coordinator node receives a query from a client. The client requests that the query be executed by the database.

In response, in step 212, the coordinator node transmits the query to the global resource manager requesting that the global resource manager can reserve the resources.

In step 214, the coordinator node receives an execute query message from the global resources manager. The execute query message indicates that the resources have been reserved on the data nodes, and the data nodes are ready to execute the query.

In response to the execute query message, the coordinator node transmits execute query messages to the data nodes in step 216. These execute query messages request that the data nodes execute the query.

After the data nodes perform the query, they transmit the results to the coordinator node. The coordinator node receives these results in step 218.

In an embodiment, a global resource management layer is not used. Instead of having two layers of resource management, only the local layer is used. Every data node manages its own resources and makes the decision on accepting or rejecting execution tasks. This is a completely distributed solution, and is very scalable. However, deadlocks may be an issue in some cases without a global view of the resource management for the entire system.

In another embodiment, a two-phase communication protocol is used. Two-phase dispatching lowers the communication cost in a single dispatching attempt. However, there is a higher rate of unsuccessful scheduling attempts. With three-phase dispatching, a set of queries can be sent in the first phase, so that an intersection of the replies from the data nodes may be performed to determine the query that can be accommodated by all involved data nodes.

In an additional embodiment, queries sent in the first phase are sorted by their submission timestamps, so that the replies from the data nodes specify the maximum number of queries in the group, starting from the first one. If the intersection from the data nodes has more than one query, multiple queries may be scheduled at once. Flexibility of scheduling queries out of their submission order is reduced.

Figure 7:
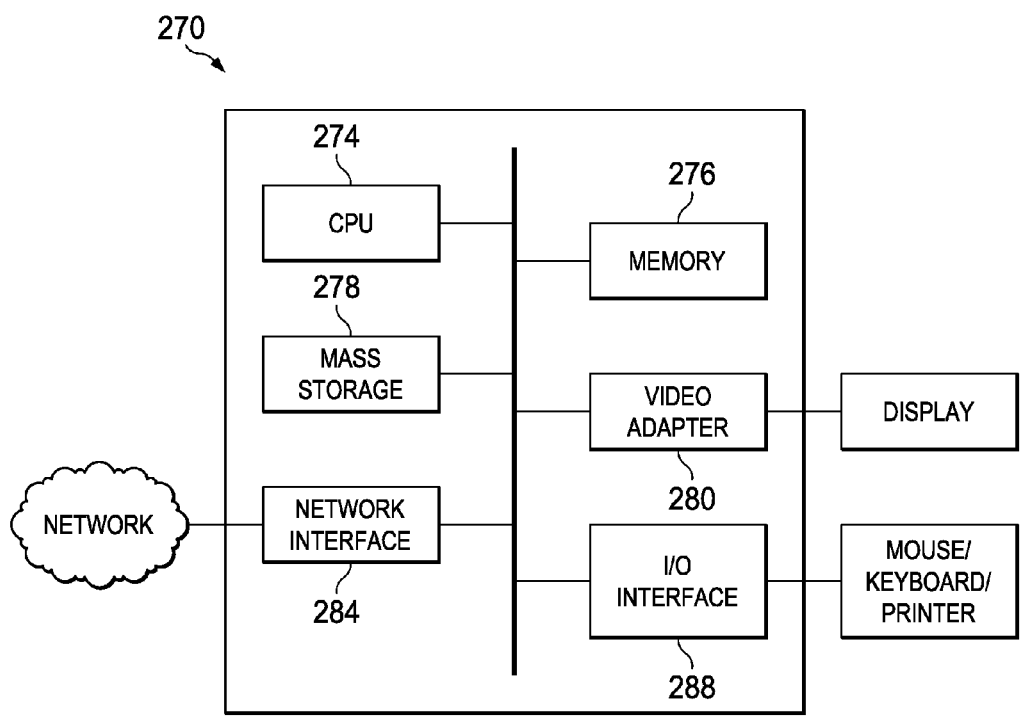
FIG. 7 illustrates a block diagram of an embodiment general-purpose computer system.

FIG. 7 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for managing database resources, the method comprising:
    selecting a first query from a queue of queries;
    transmitting, by a global resource manager to a portion of a plurality of data nodes, a plurality of reserve resource messages;
    receiving, by the global resource manager from the portion of the plurality of data nodes, a plurality of acknowledgement messages; and
    transmitting, by the global resource manager to a coordinator node, an execute query message when the plurality of acknowledgement messages are positive acknowledgements.

2. The method of claim 1, further comprising:
    transmitting, by the global resource manager to the plurality of data nodes, a plurality of which one can execute (WOCE) messages, wherein the messages of the plurality of WOCE messages comprise the queue of queries; and
    receiving, by the global resource manager from the plurality of data nodes, a plurality of sets of query candidates.

3. The method of claim 2, further comprising determining an intersection of the plurality of sets of query candidates to determine a group of executable queries of the queue of queries.

4. The method of claim 3, further comprising waiting for a freed resources message from a first data node of the plurality of data nodes when the intersection of the plurality of sets of query candidates is an empty query set.

5. The method of claim 3, wherein selecting the first query comprises selecting the first query from the intersection of the group of executable queries of the queue of queries.

6. The method of claim 2, wherein a first WOCE message of the plurality of WOCE messages comprises the queue of queries and resource requirements of queries of the queue of queries.

7. The method of claim 1, further comprising:
    receiving, by the global resource manager from the coordinator node, a second query; and
    placing the second query in the queue of queries.

8. The method of claim 1, wherein selecting the first query from the queue of queries comprises selecting the first query in accordance with a submission timestamp of the first query.

9. The method of claim 1, further comprising removing the first query from the queue of queries after selecting the first query.

10. The method of claim 9, further comprising, when one of the acknowledgment messages is a negative acknowledgement:
    transmitting a plurality of cancellation messages to the plurality of data nodes; and
    placing the first query in the queue of queries.

11. The method of claim 1, further comprising receiving, by the global resource manager from the plurality of data nodes, a plurality of freed resources messages after transmitting the execution message.

12. The method of claim 1, further comprising waiting for the first query from the coordinator node when the queue of queries is empty.

13. A method for managing database resources, the method comprising:
    transmitting, by a data node to a global resource manager, a plurality of query candidates, wherein the data node has sufficient resources to execute the plurality of query candidates;
    receiving, by the data node from the global resource manager, a reserve resources message;
    reserving a portion of resources of the data node, wherein the reserve resources message indicates the portion of resources;
    transmitting, by the data node to the global resource manager, an acknowledgement message, wherein the acknowledgement message is a positive acknowledgement when reserving the portion of resources is successful and a negative acknowledgement when reserving the portion of resources is not successful; and receiving, by the data node from a coordinator node, an execute query message.

14. The method of claim 13, further comprising receiving, by the data node from the global resource manager, a which one can execute (WOCE) message, wherein the WOCE message comprises a queue of queries and resources requested by queries of the queue of queries before transmitting the plurality of query candidates.

15. The method of claim 13, further comprising:
executing a first query in accordance with the execute query message to produce results; and
transmitting, by the data node to the coordinator node, the results.

16. The method of claim 15, further comprising transmitting, by the data node to the global resource manager, a resources available message after executing the query.

17. The method of claim 13, further comprising:
receiving, by the data node from the global resource manager, an abort query message; and
freeing the portion of resources.

18. A method of managing database resources, the method comprising:
receiving, by a coordinator node from a global resource manager, an execute query message indicating a first query;
transmitting, by the coordinator node to a plurality of data nodes, a plurality of execute query messages indicating the first query; and
receiving, by the coordinator node from the plurality of data nodes, messages comprising results of the first query.

19. The method of claim 18, further comprising:
receiving, by the coordinating node from a client, a first query request indicating the first query; and
transmitting, by the coordinating node to the global resource manager, a query request indicating the first query before receiving the execute query message.

20. A computer comprising:
a processor; and
a computer readable storage medium storing programming for execution by the processor, the programming including instructions to
select a first query from a queue of queries,
transmit, to a portion of a plurality of data nodes, a plurality of reserve resource messages,
receive, from the portion of the plurality of data nodes, a plurality of acknowledgement messages, and
transmit, to a coordinator node, an execute query message when the plurality of acknowledgement messages are positive acknowledgements.

* * * * *